United States Patent
Carrascosa Peréz et al.

(10) Patent No.: US 9,016,271 B2
(45) Date of Patent: Apr. 28, 2015

(54) RADIATION HEAT COLLECTION DEVICE

(75) Inventors: Marco Antonio Carrascosa Peréz, Madrid (ES); Manuel Julián Luna Sánchez, Madrid (ES); Abel Garcia-Miján Gómez, Madrid (ES); Fernando Rueda Jimenez, Madrid (ES)

(73) Assignee: Aries Ingenieria Y Sistemas, S.A., Madrid (ES)

( * ) Notice: Subject to any disclaimer, the term of this patent is extended or adjusted under 35 U.S.C. 154(b) by 469 days.

(21) Appl. No.: 13/322,316

(22) PCT Filed: May 25, 2010

(86) PCT No.: PCT/EP2010/057189
§ 371 (c)(1),
(2), (4) Date: Jun. 22, 2012

(87) PCT Pub. No.: WO2010/136471
PCT Pub. Date: Dec. 2, 2010

(65) Prior Publication Data
US 2014/0102438 A1   Apr. 17, 2014

(30) Foreign Application Priority Data
May 26, 2009   (EP) ..................................... 09382082

(51) Int. Cl.
*F24J 2/05* (2006.01)
*F24J 2/14* (2006.01)
*F24J 2/46* (2006.01)

(52) U.S. Cl.
CPC .. *F24J 2/055* (2013.01); *F24J 2/14* (2013.01); *F24J 2/4647* (2013.01); *Y02E 10/44* (2013.01); *Y02E 10/45* (2013.01); *F24J 2/4636* (2013.01)

(58) Field of Classification Search
USPC ......... 126/652, 664, 694, 708, 653, 670, 657, 126/676, 707; 285/123.1, 123.12, 124.2, 285/105, 345, 351; 137/15.09
See application file for complete search history.

(56) References Cited

U.S. PATENT DOCUMENTS 4,251,284 A * 2/1981 Oster, Jr. ........................ 136/247
4,281,637 A * 8/1981 Wilson .......................... 126/586
(Continued)

FOREIGN PATENT DOCUMENTS

DE    4117651 A1   12/1992
DE   19821137 A1   11/1999
(Continued)

*Primary Examiner* — Alfred Basichas
(74) *Attorney, Agent, or Firm* — Tristan A. Fuierer; Moore & Van Allen, PLLC

(57) ABSTRACT

This invention relates to a device that comprises at least one collection unit (11), equipped with a collection tube (21) placed on supports (23), which is formed by an inner absorber tube (31) shaped as a continuous tube and an outer envelope tube (33). The collection unit (11) also comprises reflectors (15) that direct the radiation toward the collection tube (21). Moreover, the device comprises means (41, 43) designed to maintain the collection tube (21) space between the absorber tube (31) and the envelope tube (33) at a pressure of between $5 \cdot 10^{-1}$-$5 \cdot 10^{-2}$ mbar. The main advantages of the invention include the reduction in the breaking of glass due to the lower stresses to fatigue, an increase in the effective collection surface (97%-99%) and active management of the vacuum, which makes it possible to monitor the evolution thereof at all times.

29 Claims, 9 Drawing Sheets

(56) References Cited

U.S. PATENT DOCUMENTS

| | | |
|---|---|---|
| 6,024,086 A * | 2/2000 | Rich .................. 126/664 |
| 6,705,311 B1 | 3/2004 | Schwartzman et al. |
| 7,398,779 B2 * | 7/2008 | Bowen et al. .......... 126/639 |
| 2007/0039611 A1 * | 2/2007 | Benvenuti ............. 126/652 |
| 2008/0023061 A1 * | 1/2008 | Clemens et al. ........ 136/246 |
| 2010/0176602 A1 * | 7/2010 | Shinnar ................ 290/1 A |

FOREIGN PATENT DOCUMENTS

| | | |
|---|---|---|
| DE | 10036746 A1 | 1/2002 |
| DE | 10335214 A1 | 3/2005 |
| JP | 57155059 A | 9/1982 |

* cited by examiner

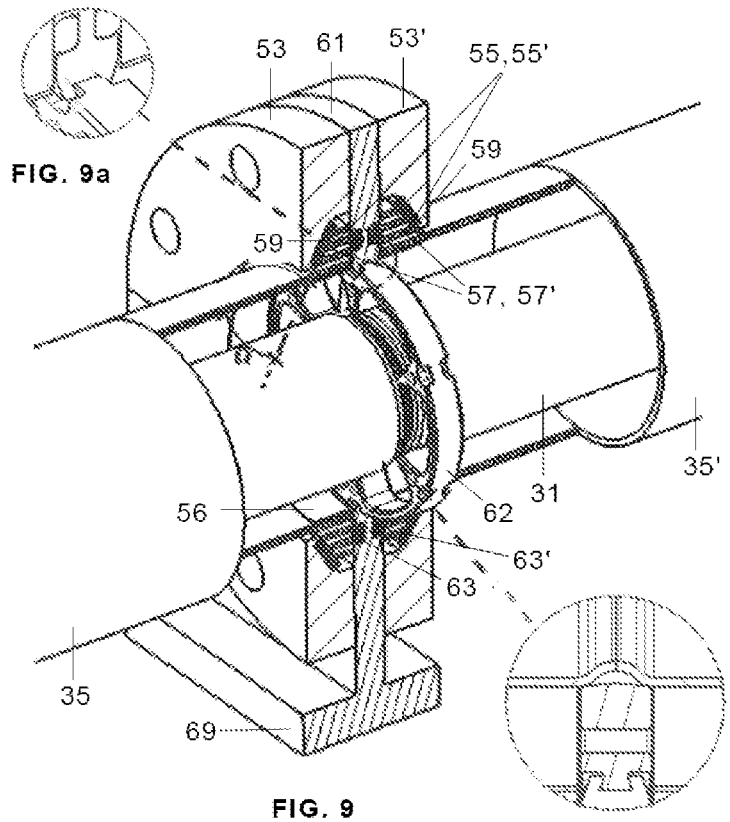
FIG. 9a
FIG. 9
FIG. 9b
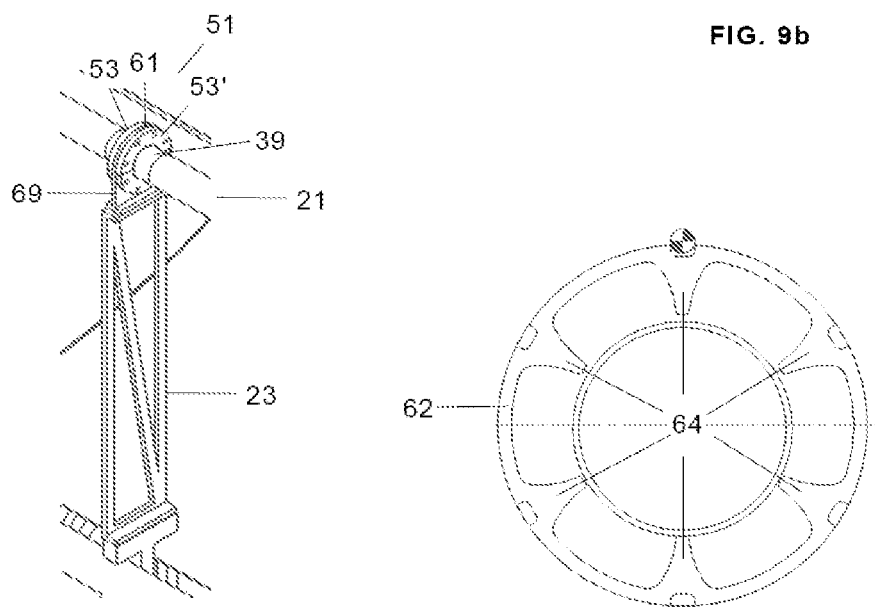
FIG. 8
FIG. 10

RADIATION HEAT COLLECTION DEVICE

CROSS-REFERENCE TO RELATED APPLICATIONS

This application is filed under the provisions of 35 U.S.C. §371 and claims the priority of International Patent Application No. PCT/EP2010/057189 filed on 25 May 2010 entitled "Radiation Heat Collection Device" in the name of Marco Antonio CARRASCOSA LÓPEZ, et al., which claims priority to European Patent Application No. EP 09382082.7 filed on 26 May 2009, both of which are hereby incorporated by reference herein in their entirety.

FIELD OF THE INVENTION

This invention relates to a radiation heat collection device and, more particularly, to a heat collection device which uses a parabolic reflector that focuses the solar heat radiation onto an absorber tube.

BACKGROUND OF THE INVENTION

The solar heat collection devices that use cylindrical-parabolic concentrators known in the state of the art are based on the developments arising from the construction of thermoelectric plants called "Segs", which were implemented in the United States in the 1980s.

The known designs use structures that act as supports for the reflector elements that make up the parabolic reflector profile and the absorber tube located on the theoretical focal line of the parabolic cylinder formed by the reflectors. These structures are usually formed by inter-connected modules and equipped with an orientation mechanism that makes it possible to collect the maximum possible radiation by following the sun.

The reflector elements may be composed of different materials, made using different processes and supported in different ways, but, in any event, the objective is to obtain the maximum possible reflectivity and the maximum geometric precision such that, following the optical laws of reflection and refraction, the reflected beam interception deviation with respect to the theoretical focal point is as small as possible.

One of the main elements of the device is the tube in charge of absorbing the maximum possible energy of that reflected from the reflector surface and transmitting it as efficiently as possible to the heat-transfer fluid used. In order to prevent losses by thermal convection, the absorber tube, normally made of a metallic material with a suitable selective-layer coating, is surrounded by a glass envelope tube, and the intermediate space is subjected to high vacuum, which requires hermetic glass-metal joints and high-quality metal-metal welds subjected to vacuum. U.S. Pat. No. 6,705,311 describes specific solutions in this regard.

On the other hand, configuration of the device with completely airtight segments with high vacuum requirements has favoured the use of Getter systems for hydrogen absorption, such as that disclosed in US 2004134484.

The disadvantages of the solar collection devices known in the state of the art include the following:

High cost of the absorber tubes.
Breaking of the glass-metal joints, with the consequent loss of vacuum and, therefore, of yield.
Breaking of the glass tube at the joint areas.
Need to perform costly temperature and vacuum degasification processes that allow to activate the getter system.
Undetectability of the loss of vacuum in a tube or great uncertainty of the tracers specified, with low confidence regarding the information prior to the failure.
Possible saturation of H2 in the getter system through time for temperatures below the working temperature, which would cause a significant loss of yield.
Impossibility to easily measure the vacuum during the device's operating life.
Need to use materials such as glass for the envelope tube and glass-metal joints due to the high level of vacuum required.
High replacement cost in the event of breakage.
Impossibility to repair the replaced element.
Limited useful surface due to the need to absorb the differential dilations between the inner tube and the outer cover by means of bellows and connecting elements.

This invention is intended to overcome these disadvantages.

SUMMARY OF THE INVENTION

One object of this invention is to provide robust, controllable thermoelectric plants that ensure a minimum level of inoperativity, caused by the breaking of their components and the need for complex maintenance operations to replace them, during their operating life.

Another object of this invention is to provide thermoelectric plants that allow for flexible, cost-optimized production and exploitation.

Another object of this invention is to provide thermoelectric plants that make it possible to increase the interception factor and, consequently, the yield thereof.

Another object of this invention is to provide thermoelectric plants that make it possible to increase the effective surface in the absorber element, and, consequently, the yield thereof.

These and other objects are achieved by means of a heat collection device that comprises at least one collection unit equipped with a collection tube, formed by an inner absorber tube and an outer envelope tube, and reflectors that direct the radiation to the collection tube, wherein:

The inner absorber tube is shaped as a continuous tube.
The outer envelope tube is formed by multiple segments united by joints through hermetic sealing bands, wherein said joints include support and slide means for the inner absorber tube.
The collection tube supports have a rigid structure and are fixed to the collection unit's bearing structure.
There are means available to maintain a pressure of between $5 \cdot 10^{-1}$-$5 \cdot 10^{-2}$ mbar in the collection tube space between the inner absorber tube and the outer envelope tube when the device is operative.

In a preferred embodiment of this invention, the heat collection device collects solar radiation by means of a parabolic reflector, amongst other elements.

In a preferred embodiment of this invention, said heat collection device also comprises means for introducing gas into the collection tube which allow for hydrogen drag. Jointly with the vacuum production means, this leads to a device that makes it possible to monitor and control the vacuum level and the presence of hydrogen in the intermediate space between the inner absorber tube and the outer envelope tube, which contributes to optimizing the yield of the device.

In a preferred embodiment of this invention, the joints of all the segments making up the outer envelope tube are fixed to the collection tube supports. This provides for a very robust heat collection device.

In a preferred embodiment of this invention, part of the joints of all the segments making up the outer envelope tube are supported in a displaceable manner on the collection tube supports. This provides for a heat collection device wherein maintenance operations are reduced.

In a preferred embodiment of this invention, the outer envelope tube is made of glass, with a thickness of between 2.5 and 3.5 mm. This provides for a heat collection device with a very optically efficient collection tube.

In a preferred embodiment of this invention, the outer envelope tube is made of Polymethylmethacrylate (PMMA). This provides for a heat collection device with a less expensive collection tube.

In a preferred embodiment of this invention, the inner absorber tube has an oval cross-section. This provides for a heat collection device with a collection tube that improves the utilization of solar radiation.

In different preferred embodiments of this invention, inner absorber tubes with a circular cross-section are used, with a diameter between 70 and 90 mm and/or configurations with focal lengths Fl between 1,700 mm and 1,900 mm. This provides for more efficient heat collection devices.

In different preferred embodiments of this invention, the segments of the outer envelope tube have a length of between 4 and 6 m, and the segments of the inner absorber tube have a length of between 12 and 16 m. This provides for easy-to-assemble heat collection devices.

Other characteristics and advantages of this invention will arise from the detailed description of an embodiment that illustrates the object thereof in relation to the accompanying figures.

DESCRIPTION OF THE FIGURES

FIG. 8 is a perspective view of a first embodiment of the segment joint of the outer envelope tube in a heat collection device in accordance with this invention.

FIG. 9 is a partial-section perspective view of said first embodiment of the joint, and FIGS. 9a and 9b are detailed views of two areas of the joint.

FIG. 10 is a cross-section view of the insulation crown of the joint illustrated in FIG. 9.

DETAILED DESCRIPTION OF THE INVENTION

Figure 1:
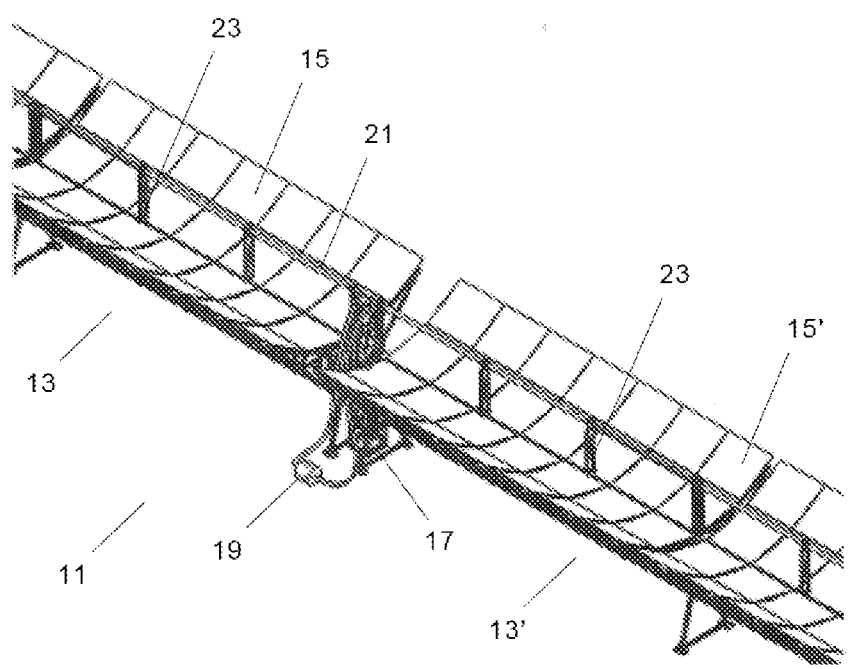
FIG. 1 is a perspective view of a collection unit of a heat collection device in accordance with this invention.

FIG. 1 represents a collection unit 11 of a heat collection device formed by two semi-collectors 13, 13' with reflectors 15, 15' that reflect the radiation toward collection tube 21, which extends along the focal line of said reflectors 15, 15' and is placed on supports 23 fixed to the bearing and guiding structure of collection unit 11. Central area 17 of said structure also contains components 19 of the vacuum and gas drag systems whereto we will refer further below.

Figure 2:
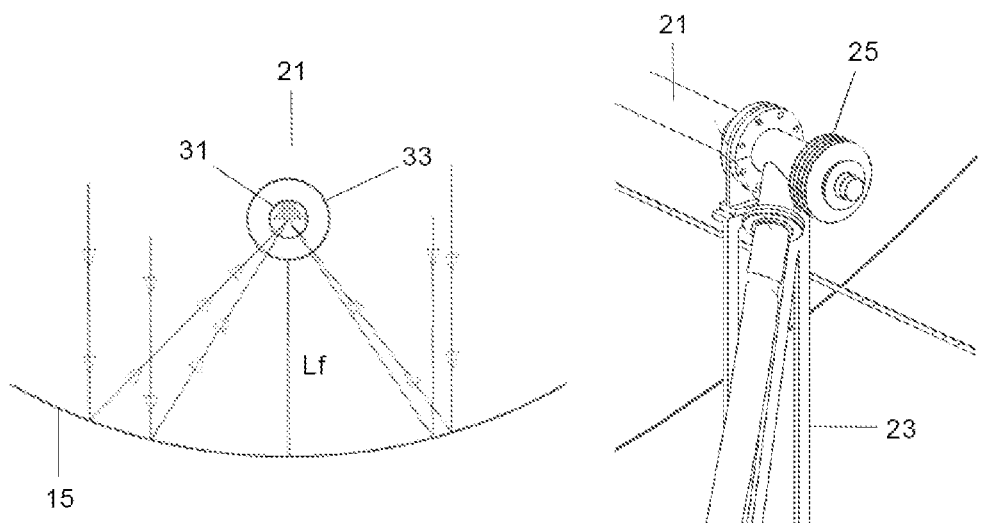
FIG. 2 schematically shows the directioning of radiation toward the collection tube of a solar heat collection device in accordance with this invention.

Oil or another fluid circulates through collection tube 21; it is heated by the radiation and transmitted to a heat exchanger or directly to a turbine in the event that Water-Steam is used as the heat-transfer fluid in order to, for example, produce electrical energy, or to another device designed to utilize the fluid's calorific energy. As shown in FIG. 2, collection tube 21, which receives the beams reflected by a reflector 15, comprises an inner absorber tube 31 and an outer envelope tube 33 with an intermediate space that, as we shall see, is subjected to controlled vacuum when collection unit 11 is operative.

In the installations known in the state of the art, inner tube 31 has a diameter of about 70 mm and the focal length, Fl, is located at about 1,700 mm; as is well known, these magnitudes are determined by the characteristics of the parabolic concentrators for purposes of optimizing the interception factor of the reflected beams.

Inner absorber tube 31 and outer envelope tube 33 may be made of the same type of materials used in the thermoelectric plants known in the state of the art, typically metal coated with selective layers for the absorber tube and glass for the envelope tube.

In a preferred embodiment of the invention, the thickness of outer envelope tube 33, made of glass, is between 2.5 and 3.5 mm, and, preferably, 3 mm for borosilicates.

Outer envelope tube 33 may also be made of other suitable transparent materials, such as Polymethylmethacrylate (PMMA) including, optionally, ultraviolet filter protection treatments.

In a preferred embodiment of the invention, inner absorber tube 31 is formed by welded segments with lengths of between 12 and 16 meters, and outer envelope tube 33 is formed by segments with lengths of between 4 and 6 meters. Said segments may be joined by means of retractable bushings, allowing the effective length of outer tube 33 to lie between 98.5% and 99%.

The assembly of inner tube 31 and outer tube 33 may be achieved by means of removable temporary supports to be removed after welding and closing the segment components. Furthermore, adaptable fixation systems, preferably spherical bridle joints, may be installed between segments in order to allow for angular deviations or misalignment between components.

Figure 19:
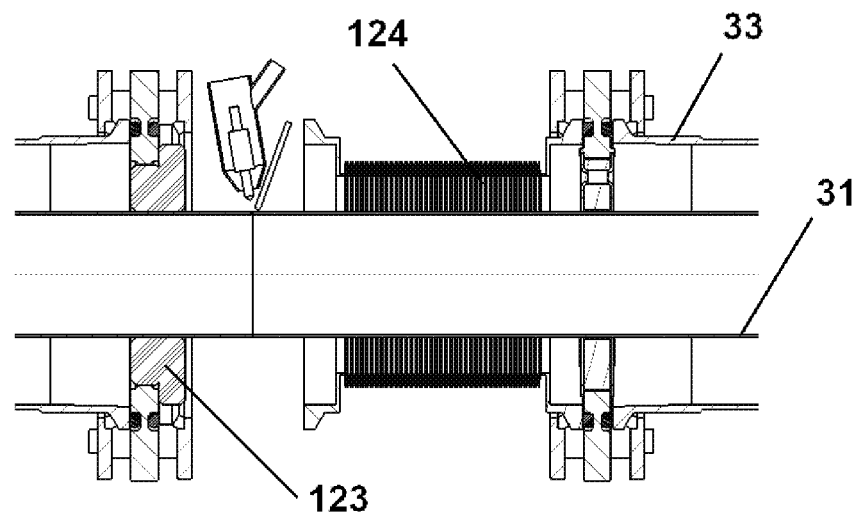
FIG. 19 shows the connection of segments by using bellows and dummy components in a preferred embodiment of the invention.

In a preferred embodiment of the invention, the connection of the welded segments, during the assembly process, comprises the isolation of the segments comprised in the outer envelope tube 33 by means of dummy components 123, 125. As depicted in FIG. 19, a joint comprising a compensation bellows 124 allows the welding of inner segments by the compression of said bellows, while the dummy component 123, preferably made of a ceramic material, remains in the connection area between outer segments, until the inner tube 31 is welded and the bellows returns to its uncompressed state.

Figure 20:
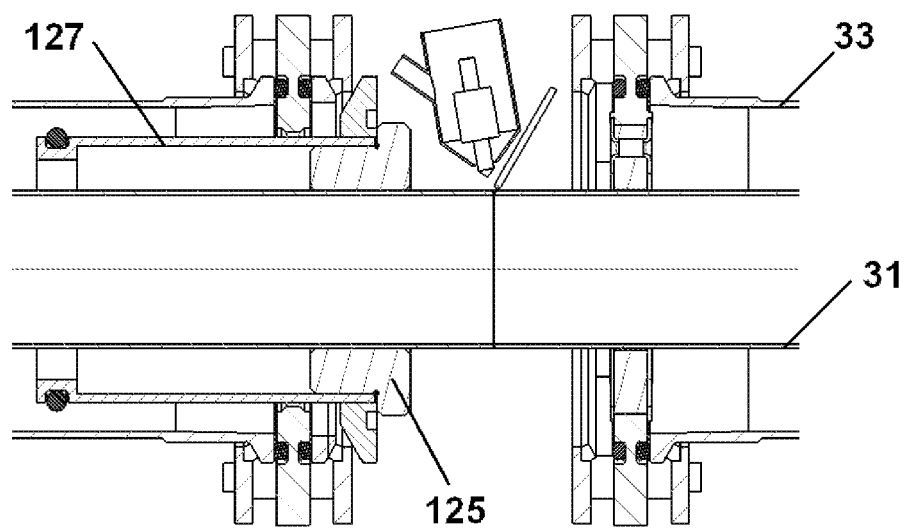
FIG. 20 shows the connection of segments by using retractable bushings and dummy components in a preferred embodiment of the invention.

In another preferred embodiment of the invention (FIG. 20), the connection between segments of outer tube 33 is made by means of retractable bushings 127 located inside said outer tube 33, without making use of a bellows connection. This embodiment presents the advantage of improving the effective length of outer tube 33. As in the embodiment shown in FIG. 19, one or more dummy components 125 may be used to isolate the outer tube 33 segments, while welding or cutting the inner tube 31.

The segment joints of outer envelope tube 33 are placed on supports 23 and shaped, as shown further below, to fulfill a three-fold purpose: that the intermediate space between outer envelope tube 33 and inner absorber tube 31 may be subjected to vacuum, that the segments of outer envelope tube 33 may dilate/contract due to an increase/reduction in the temperature without compromising its integrity nor the airtightness of said intermediate space, and that they provide a support and slide base for inner absorber tube 31 such that it may freely dilate/contract thereon. In different embodiments of the invention, each pair of adjacent segments comprised in each inner absorber tube 31 may be supported under a common shared support 23.

Figure 3:
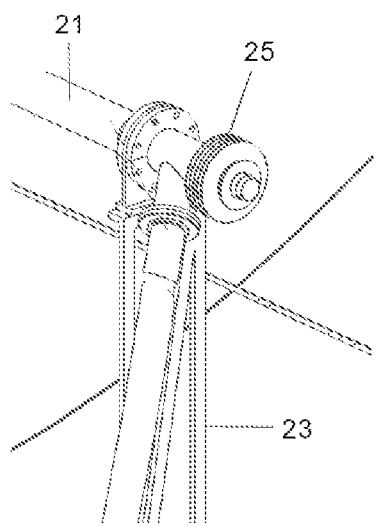
FIG. 3 is a perspective view of the final part of the collection tube of a heat collection device in accordance with this invention.

Consequently, inner absorber tube 31 freely dilates independently from outer envelope tube 33 and the dilations of the latter are absorbed at the joints of the segments that compose it; therefore, the intermediate space between both, which extends along the entire device, may act as a vacuum chamber. In the final part of each collection tube 21, a bellows 25 (see FIG. 3) accumulates the total dilations of inner absorber tube 31 with respect to the last support 23, without transmitting a cyclized load to envelope tube 33. Thus, bellows 25 are the closing elements of the above-mentioned vacuum chamber.

Figure 4:
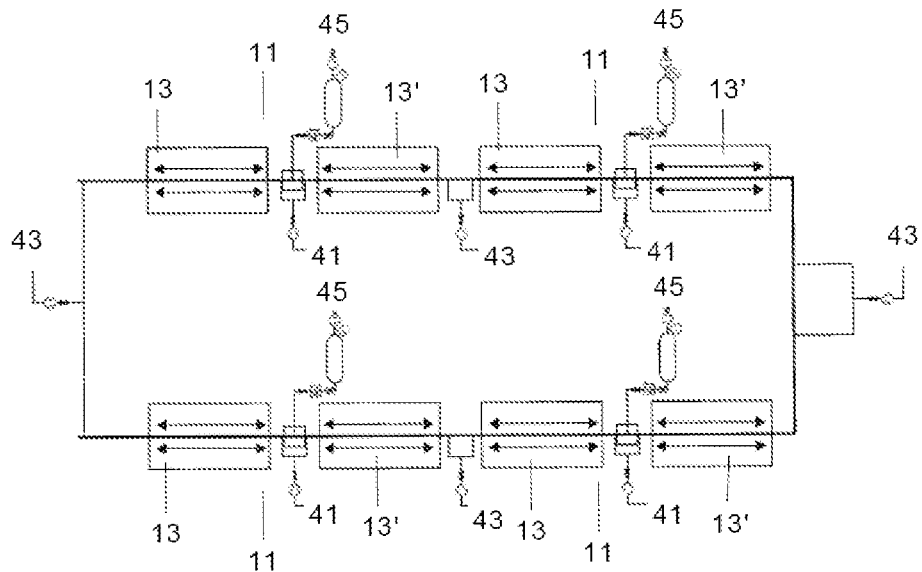
FIG. 4 is a schematic diagram that illustrates the vacuum formation process in a heat collection device in accordance with this invention formed by four collection units.
Figure 5:
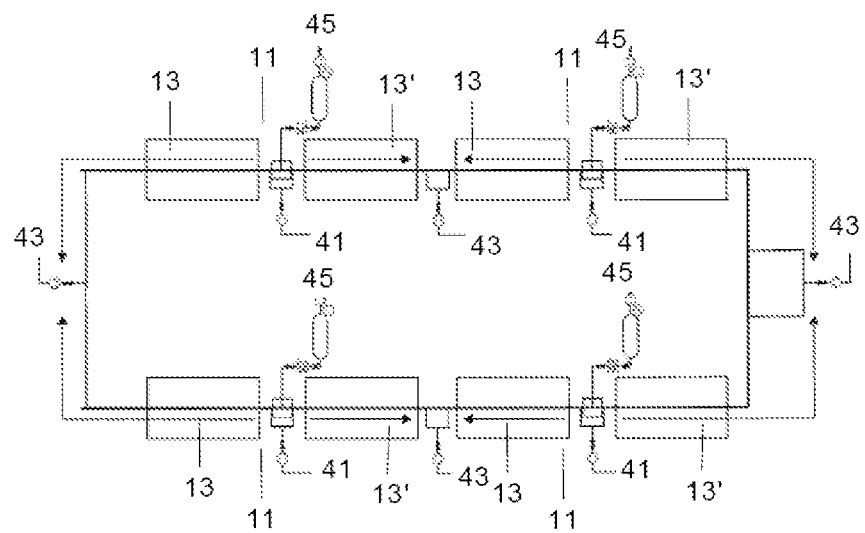
FIG. 5 is a schematic diagram that illustrates the gas drag in a heat collection device in accordance with this invention formed by four collection units.

FIGS. 4 and 5 schematically illustrate the vacuum and gas drag systems of a heat collection device in accordance with the invention composed of four collection units 11, each formed by two semi-collectors 13, 13'.

The vacuum system comprises a central vacuum pump 41 and two end vacuum pumps 43 for each collection unit 11. FIG. 4 illustrates the air flow with all the pumps 41, 43 under operating conditions.

The gas drag system comprises a gas-dispensing element 45 connected to the central part of each collector 11. FIG. 5 illustrates the gas flow when the system is started with dispensing elements 45 and end pumps 43 under operating conditions. Alternatively, the gas drag system may comprise only one commutable pump 45 connected to the central part of each collector 11 comprising gas accumulation systems for dragging the gas inside the collector 11, in order to manage the pressure state inside each semi-collector 13, 13' in a non-simultaneous way.

Figure 6:
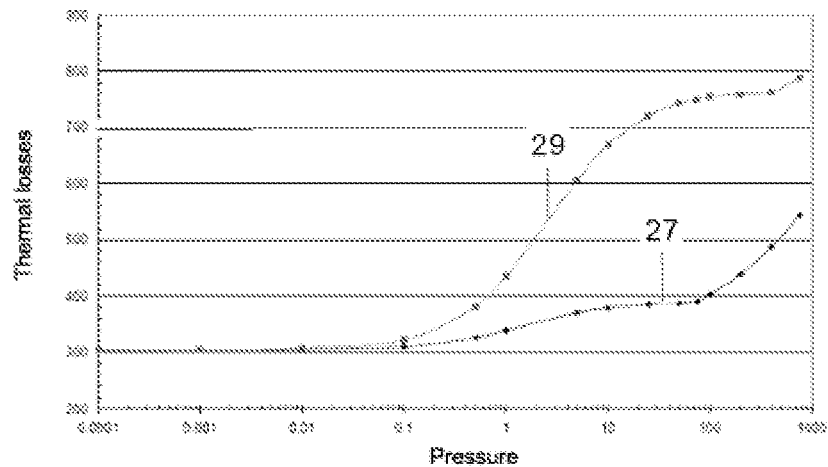
FIG. 6 is a diagram that shows the relationship between heat losses and pressure in the intermediate space between the outer envelope tube and the inner absorber tube for air and hydrogen.

The operation of the heat collection device in accordance with this invention may be described as follows:

The device receives direct radiation by orientation toward the radiation source in one or two axes, preferably one axis for thermoelectric production applications, by heating the surface of inner absorber tube 31, which causes heating of the oil circulating inside. Right before the device is oriented toward the radiation heat source, vacuum pumps 41, 43 begin to create a vacuum in the intermediate space between inner absorber tube 31 and outer envelope tube 33 until a maximum pressure, of between $5 \cdot 10^{-1}$ and $5 \cdot 10^{-2}$ mbar, is achieved along the entire length. This pressure is sufficient to almost completely eliminate heat losses through the vacuum chamber when the material inside it is primarily air; this is not the case when the gas is hydrogen, as may be seen in FIG. 6, in curves 27, 29 that show the relationship between heat losses and pressure for, respectively, air and hydrogen. This Figure is taken from "*Technical Report: Heat transfer analysis and Modeling of a Parabolic Trough Solar Receiver Implement in Engineering Equation Solver*. R. Forristel". The joints of outer envelope tube 33, whereto we will refer in more detail further below, make it possible to achieve that vacuum level, such that it is not necessary to implement high-vacuum tubes with hermetic seals, GTMS welds and Getter systems. As the heating takes place, the temperature of inner absorber tube 31 increases to its maximum, between 400° C. and 600° C., thereby increasing the length, sliding along the support and positioning means placed on the joints, which are designed for point contact. Supports 23 of outer envelope tube 33 are fixed and, therefore, will remain in the specified position during said operation.

During operation of the heat collection device, the vacuum action will be maintained only as long as necessary, due to the degasification produced by the surface of the components of inner absorber tube 31. Everyday operation will provide for a direct degasification system in the installation, such that it is not necessary to perform said operation in each inner absorber tube prior to assembling it. In the event that the heat losses increase due to the presence of hydrogen, a drag operation will be performed which consists of introducing a given gas, such as dry air, $CO_2$ or others with a conduction coefficient equal to or lower than that of air, into the vacuum chamber by means of dispensing elements 45, controlling either the flow rate, the temperature of the gas introduced, or both, in order to prevent potential thermal shocks, in the event that glass outer envelope tubes 33 are used, and the subsequent discharge by means of the vacuum system. The previous operation will make it possible to control, whenever necessary, the partial pressure of hydrogen and, therefore, the rate of heat loss due to the existing gas mixture and the vacuum chamber pressure. If outer envelope tube 33 is made of a suitable transparent plastic material, such as Polymethylmethacrylate (PMMA), there is no risk of said thermal shocks.

The vacuum and gas drag systems are electronically programmable and controllable systems designed to operate the dynamic vacuum on the basis of the needs at each time, without the complexity that the presence of thousands of tubes designed to last 25 years with $10^{-4}$ mbar vacuums entails.

Figure 7:
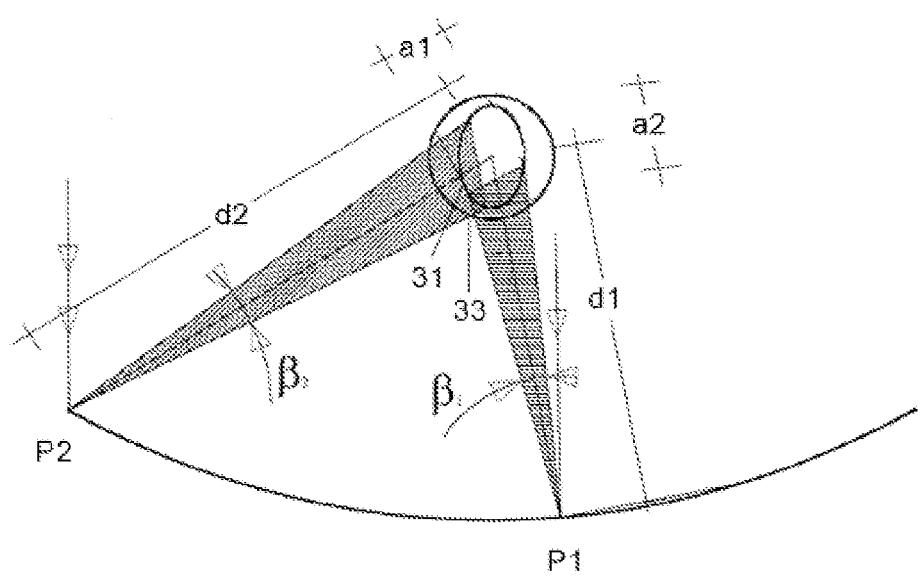
FIG. 7 is a figure similar to FIG. 2, except that the inner absorber tube of the collection tube has an oval cross-section.
Figure 11:
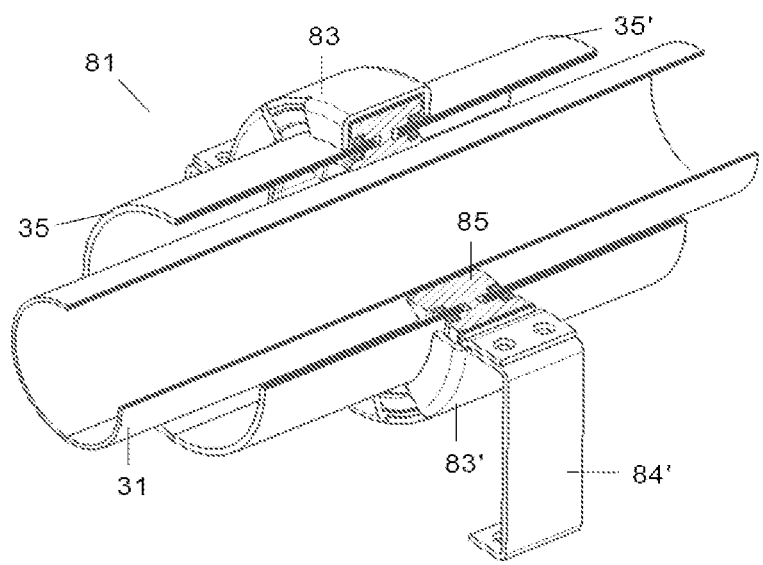
FIG. 11 is a partial-section perspective view of a second embodiment of the segment joint of the outer envelope tube in a heat collection device in accordance with this invention.
Figure 12:
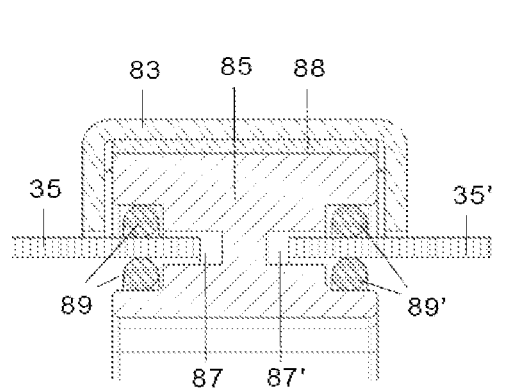
FIG. 12 is a partial view of a longitudinal section of the joint of FIG. 11.
Figure 13:
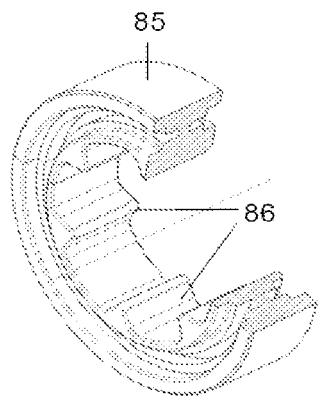
FIG. 13 is a perspective view of the insulation crown of the joint illustrated in FIGS. 11 and 12.
Figure 14:
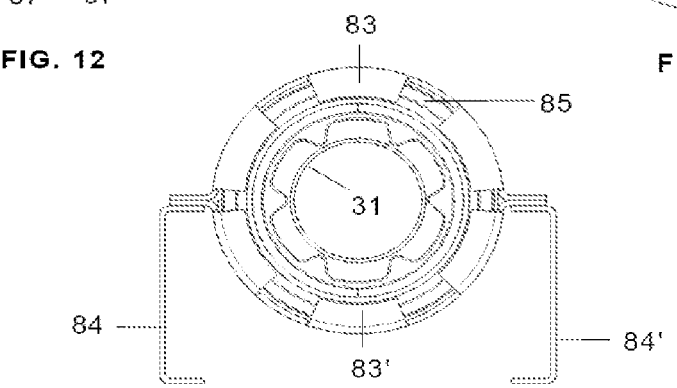
FIG. 14 is a cross-section view of the joint illustrated in FIGS. 11-13.

The independence between inner absorber tube 31 and outer envelope tube 33 also makes it possible for inner tube 31 to have, as shown in FIG. 7, an oval geometry with the major semi-axis oriented in the direction of the axis of the parabola, in order to improve the interception factor of the reflected beams, particularly at the ends of parabola 15, where there is the maximum probability of separation in the focal area. Due to the difference in the distance from the parabola to the focus at the different points thereof, the probability distribution of reflected beams at a given point of the parabola translates into an angular aperture β, the linear aperture "a" whereof will be a function of distance "d" to the focus of the point in question. FIG. 7 shows the variation of linear aperture a1 and a2 for points p1 and p2 positioned around the centre and the end of parabola 15 at distances d1 and d2, respectively. The oval geometry of inner absorber tube 31 makes it possible to increase the yield of the system using a smaller quantity of material than that necessary to cover the same area with a circular geometry. Similarly, the lateral section subject to losses by radiation will be lower than the circular equivalent.

As regards the segment joints of outer envelope tube 33, below we will describe a first embodiment of this invention, in accordance with FIGS. 8-10.

Each joint 51 comprises:

Two flanges 53, 53' with axial tightening means (FIGS. 8 and 9 do not show the typical bolts used in this type of flanges, but they do show the flange openings), the configuration whereof includes sloping surfaces 55, 55', which co-operate with enlarged edges 57, 57' of the ends of segments 35, 35' of envelope tube 33 through contact elements 59, 59'; these have a high elasticity and a low hardness in order to prevent the generation of local stresses in the glass.

A ring 61, placed between flanges 53, 53', with two hermetic sealing bands 63, 63' designed to maintain the vacuum, with a fixation base 69 on a support 23.

An insulation crown 62 bound to ring 61, and support and slide means for inner absorber tube 31, consisting of inner radial teeth 64 which provide point contacts with inner absorber tube 31 and allow it to slide with a suitable tribologic behaviour that minimizes friction and wear. Insulation crown 62 also fulfils a thermal insulation function in order to minimize losses by conduction. Preferably, it is made of a ceramic material.

Figure 21:
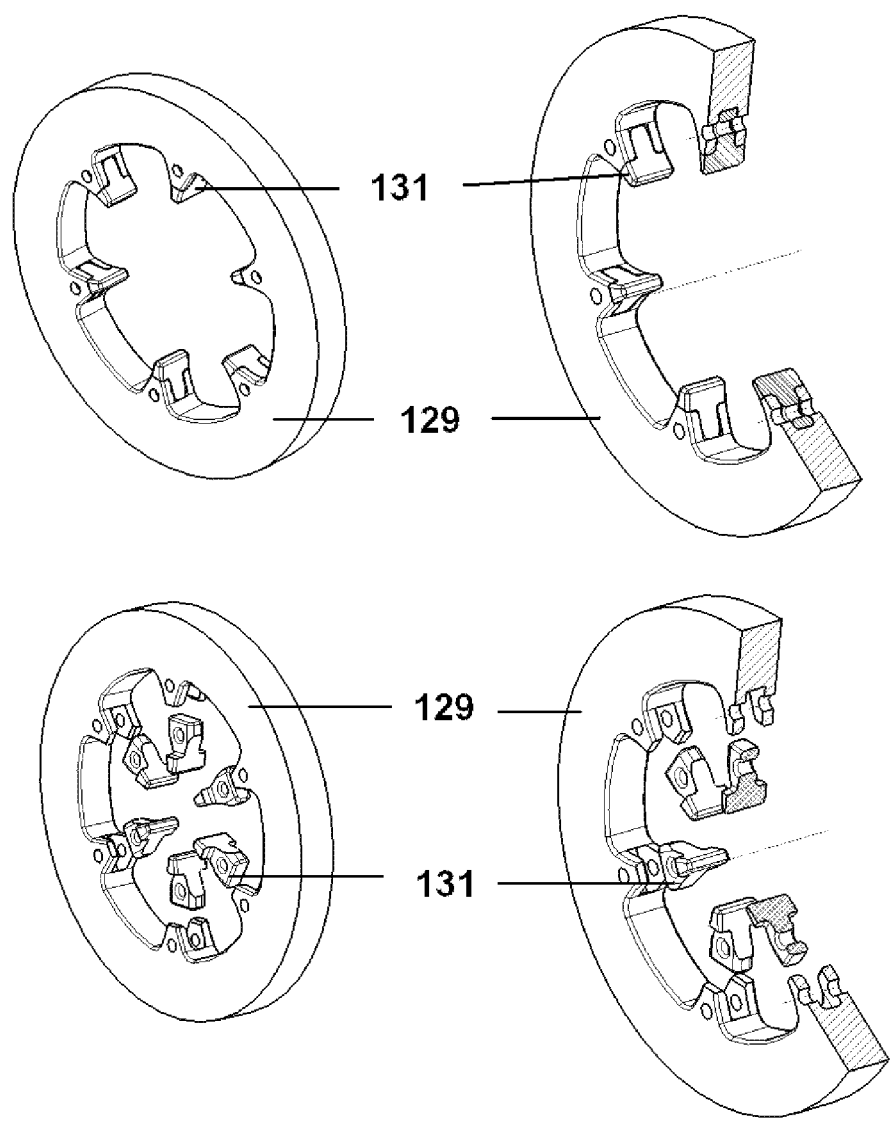
FIG. 21 shows a hybrid combination of an insulation ceramic crown connected to tooth components.

In an alternative embodiment of the invention (shown in FIG. 21), the insulation crown 62 may be built by using a hybrid composition of materials, preferably combining a ceramic crown 129 inserted with tooth components 131, preferably made of other materials with less hardness and a suitable geometry for the improvement of the tribologic behaviour of the contact points between said tooth components 131 and the inner tube 31, without loosing thermal isolation.

Insulation crown 62 is connected to support ring 61 by means of floating contacts (FIGS. 9a, 9b). Said floating contacts avoid thermal tensions between insulation crown 62 and support ring 61, due to the different thermal radial dilations caused as a consequence of the difference between the thermal expansion coefficients of their materials and the difference between their temperatures, acting as a thermal barrier.

As already mentioned, ends 55, 55' of segments 35, 35' of envelope tube 33 have an enlarged configuration in order to collaborate with flanges 53, 53' and, furthermore, their final area 56 is protected against concentrated IR and solar radiation.

This configuration of joint 51 takes advantage of the dilation of outer envelope tube 33 due to the increase in temperature, since it generates an added compression effect on sealing bands 63, due to the fixed position, as base 69 of ring 61 is fixed to support 23.

The thermal insulation system causes the temperatures in the areas of sealing bands 63, 63' not to exceed 100° C.; consequently, different materials with the adequate specifications may be used. The mean temperature of outer envelope tube 33 will be a function of the material used, but, in any event, the limited dilation thereof will be absorbed by sealing bands 63, 63'. The tightening and contact elements of segments 35, 35' of outer envelope tube 33 must have sufficient flexibility to maintain them in a radial position during the displacements thereof. Sloping surfaces 55, 55' of flanges 53, 53' have been designed for this purpose. The angle Ω to be used is a function of the elasticity of the tightening system and the load per empty weight to be borne by said system, which will generate a normal component that is a function of said angle Ω.

Furthermore, insulation crown 62 is intended to connect the vacuum or insulation chamber with the adequate conductivity by means of a design that allows for an adequate difference in pressure between the endpoints of the vacuum chamber defined between absorber tube 31 and outer tube 33, the maximum pressure being lower than $5*10^{-1}$ mbar at all times. To this end, the hydraulic diameter of the cross-section must be at least greater than 75% of that corresponding to the annular section defined by the inner diameter of outer envelope tube 33 and the outer diameter of inner absorber tube 31.

In a second embodiment, as may be observed in FIGS. 11-14, joints 81 comprise:

Two clamp-flanges 83, 83' with radial tightening means (not shown) that join to frames 84, 84', which are fixed on supports 23.

An insulation crown 85 with, on the one hand, slots 87, 87' designed to receive the pair of segments 35, 35' of outer envelope tube 33, with sufficient clearance to this end, and, on the other hand, support and slide means for inner absorber tube 31 consisting of inner radial teeth 86 which provide point contacts for inner absorber tube 31 and allow it to slide with a suitable tribologic behaviour that minimizes friction and wear. Insulation crown 85 also fulfils a thermal insulation function in order to minimize losses by conduction. Preferably, it is made of a ceramic material.

Two pairs of sealing bands 89, 89' placed on lateral openings of insulation crown 85, on the edges of said slots 87, 87', such that said segments 35, 35' remain between them and, consequently, a vacuum is maintained in the intermediate space between inner absorber tube 31 and outer envelope tube 33.

Between flanges 83, 83' and insulation crown 85, an intermediate part 88 is placed, made of an elastomer material designed to homogenize the effect of tightening flanges 83, 83' on insulation crown 85. The dilations of segments 35, 35' are absorbed with small deformations of sealing bands 89, 89'.

Although joints 51 and 81 are constructively different, they may be considered to be functionally equivalent.

In a third embodiment of the invention, illustrated in FIGS. 15-18, a group of two segments 36, 37 of outer envelope tube 33 is united by means of a joint 95 fixed onto a support 23 and the ends of that group are united to other adjacent groups by means of pairs of joints 95' supported in a displaceable manner on a support 23 with an intermediate bellows device 97 which, in turn, facilitates welding of the components of inner absorber tube 31 between two joints 95' by the contraction of bellows 97 and the subsequent assembly thereof.

Figure 15:
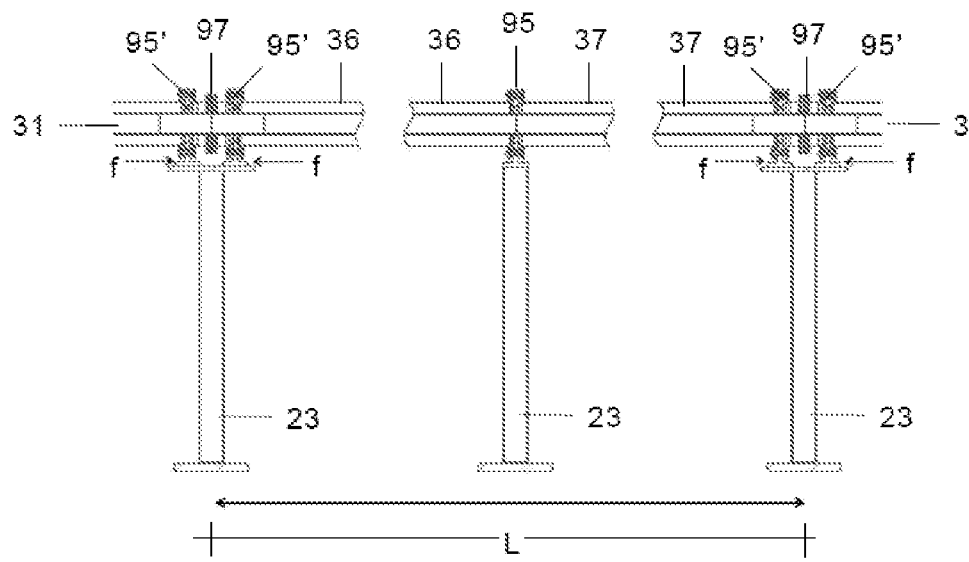
FIG. 15 is a partial elevation view of a heat collection device in accordance with this invention using a third embodiment of the segment joint of the outer envelope tube.
Figure 16:
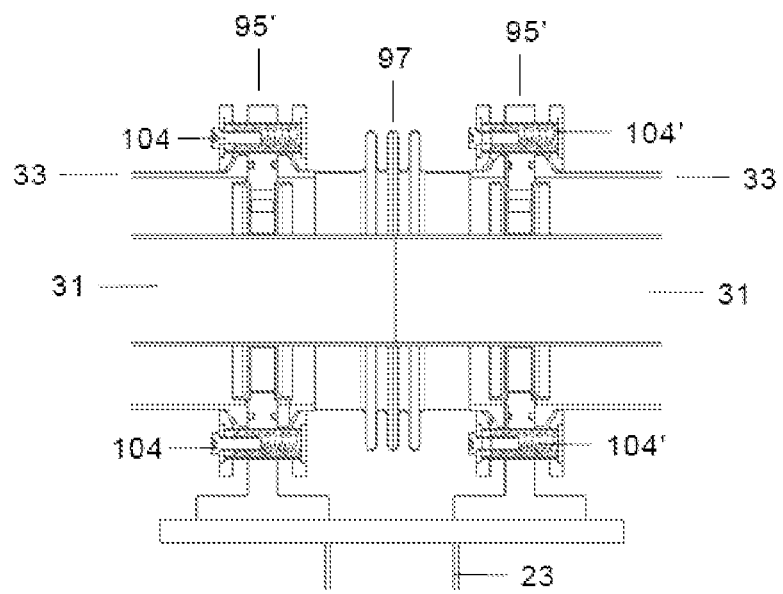
FIG. 16 is a detailed view of the area of FIG. 17 with two joints and an intermediate bellows.
Figure 17:
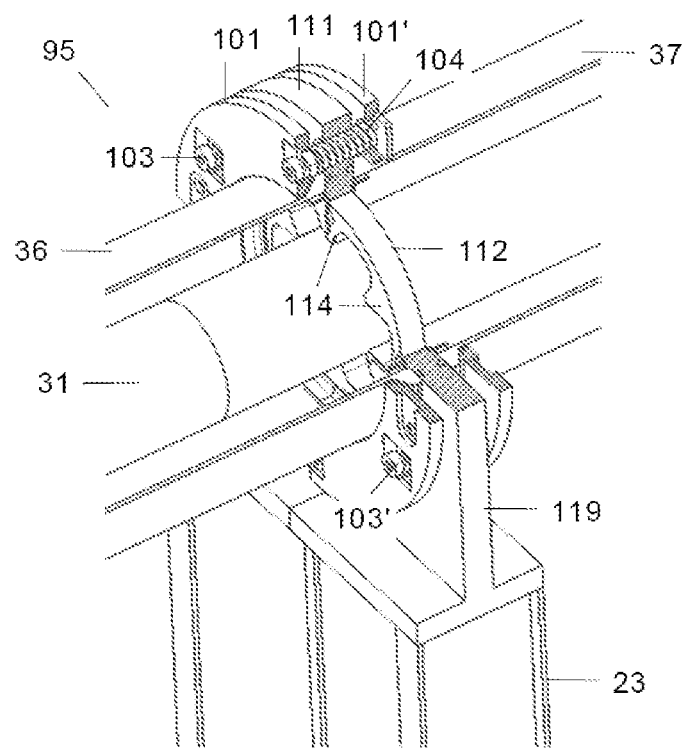
FIG. 17 is a partial-section perspective view of the joint of FIGS. 15-16.
Figure 18:
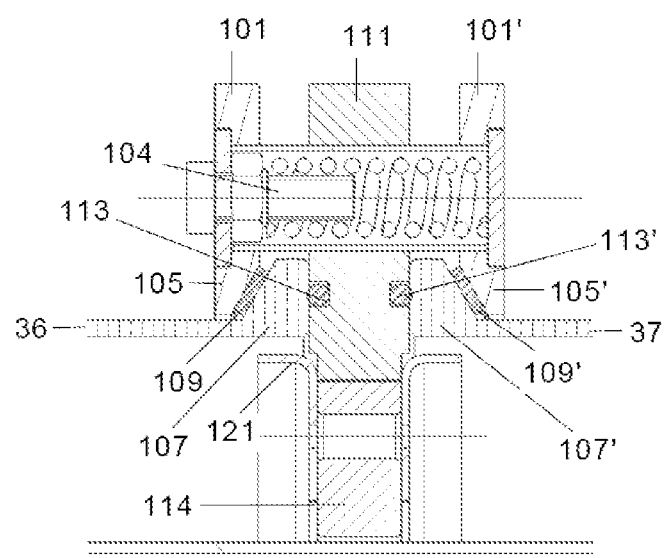
FIG. 18 is a partial view of a longitudinal section of the joint of FIG. 17.

As observed in FIG. 15, the group formed by segments 36 and 37, which has a length L of, for example, 12 m, is centrally united by a joint 95 fixed onto a support 23 and, on the ends, by joints 95' supported in a displaceable manner on supports 23. In turn, end joints 95' of each group are connected by means of a bellows 97. The arrows, f, indicate the displacements of the end joints as a consequence of the dilations of segments 36, 37 of outer envelope tube 33.

The axial dilation of segments 36, 37 of a glass envelope tube 23 may be calculated to be about 2 mm every 6 m for a maximum temperature difference of 100° C.; for this reason, supports 23 of the ends of each group of segments 36, 37 may allow for displacements of joints 95' of about 3 mm.

Bellows 97 fulfils the three following functions:
It absorbs the axial movement of adjacent glass segments, which, on the basis of the above, may be considered to be less than 6 mm.
It gives continuity to the vacuum chamber defined between inner absorber tube 31 and outer envelope tube 33.
It makes it possible to disassemble the components of the inner absorber tube in order to repair them, if necessary.

Joints 95, 95' comprise:
Two flanges 101, 101', with first tightening means 103, 103' and second tightening means 104, 104' consisting of encapsulated traction springs, the configuration whereof includes sloping surfaces 105, 105', which co-operate with enlarged edges 107, 107' of the ends of segments 36, 37 of envelope tube 33 through contact elements 109, 109', made of a material with a medium hardness and a low elasticity constant, such as Teflon.
A ring 111, placed between flanges 101, 101' with two hermetic sealing bands 113, 113' designed to maintain the vacuum, with a support base 119 on a support 23. Due to the action of tightening means 103, 103'; 104, 104', sealing bands 113, 113', which are made of an elastomer material with suitable coatings to maintain their characteristics during their estimated lifetime, always have a pre-determined degree of compression, for example 20% of the diameter thereof, regardless of the working temperature of the heat-transfer fluid and, therefore, of the temperature of outer envelope tube 33 and of inner absorber tube 31. In joints 95, support base 119 is united to support 23 and, in joints 95', it is supported on support 23, such that it may slide thereon.
An insulation crown 112 joined to ring 111 with support and slide means for inner absorber tube 31, consisting of inner radial teeth 114 that provide point contacts for inner absorber tube 31 and allow it to slide with a suitable tribologic behaviour that minimizes friction and wear. It also includes inner protectors 121 in the form of a "cooking pan", in order to protect sealing bands 113, 113' and contact elements 109, 109' against the concentrated radiation produced by the reflector mirrors which might reach them as a result of optical errors. Insulation crown 112 also fulfils a thermal insulation function in order to minimize losses by conduction. Preferably, it is made of a ceramic material, although other embodiments may be considered, as the one shown in FIG. 21.

The collection device in accordance with this invention makes it possible to surpass the magnitudes of the parabolic solar concentrators known in the state of the art in, at least, the following aspects:
The diameter of circular absorber tubes 31, which may be between 70-90 mm and equivalent dimensions in the case of absorber tubes with an oval cross-section or tubes with other types of cross-sections.
Focal length Fl, which may be between 1,700-1,900 mm. This is basically due to the greater optical precision that may be achieved with rigid supports 23 and the absence of significant movements of collection tube 21. This makes the position of the absorber tube 31 independent of the thermal fluid temperature. The current systems absorb axial dilations by the rotating displacement of the rigid supports, thereby causing a loss of position of the absorber tube with respect to the theoretical position, of 12 mm on average and 24 mm maximum, exclusively calculated on the basis of the design concept, without taking into consideration manufacturing and assembly precisions. Rigid supports 23 allow the assembly of the inner absorber tube 31 in the collection unit 11 before being transported to the plant, highly improving the assembly process of the device.

Furthermore, it allows to improve the useful collection surface of collection tube 21, which may be estimated to be between 97%-98% of the total length, thanks to the absence of both glass-metal joints and intermediate bellows for the compensation of thermal dilations, estimated to be 25 mm every 6 m as the differential dilation between the inner tube and the outer cover, as a consequence of using a continuous absorber tube 31.

The advantages of the heat collection device in accordance with the invention with respect to the solar heat collection devices known in the state of the art include the following:
Absence of GTMS welds.
Less shaded space per meter. Greater effective surface.
Absence of Getter for hydrogen control.
Potentially higher optical yield due to the possibility of fixed supports. Dilation absorbed in the end.
Possibility to use absorber tubes with a non-cylindrical geometry and, in particular, an oval geometry, which improve the yield.
Ease of assembly and process. Gasifications are not required for high vacuum levels.
No need for highly airtight joints.
Reduced breaking of glass due to lower stresses to fatigue.
Possibility to reduce the thickness of the glass outer envelope tube since GTMS welds are not required and lower stresses are borne at the ends. Improved optical yield due to better transmittance.
Active management of the vacuum and the presence of hydrogen make it possible to know the location at each time and monitor the evolution thereof, unlike in the case of hermetically closed systems.
Ease of manufacturing.
Reduced vacuum requirements.
Elimination of the need to use Getter systems and vacuum control elements in the closed chamber.
Greater precision of the position of the absorber tube with respect to the theoretical focal point, since it may move on fixed supports during dilation.
Simplification of the assembly process when mounting the absorber tube 31 in the collection unit 11, allowing the assembly before transporting the device to the plant.

Regarding the embodiments of the invention described, those modifications included within
n the scope defined by the following claims may be introduced.

The invention claimed is:
1. Radiation heat collection device that comprises at least one collection unit (11) equipped with a collection tube (21) placed on supports (23) and reflectors (15), wherein the collection tube is formed by an inner absorber tube (31) and an outer envelope tube (33), the reflectors (15) direct the radiation toward the collection tube (21), and wherein said radiation heat collection device comprises means designed to maintain the collection tube (21) space between the inner absorber tube (31) and the outer envelope tube (33) at a pressure of between $5\times10^{-1}$ to $5\times10^{-2}$ mbar when the device is operative, wherein the outer envelope tube (33) is formed by multiple segments united by joints (51, 81, 95, 95') that include support and slide means for the inner absorber tube (31), wherein said joints (81) comprise: flanges (83, 83') fixed to a support (23); an insulation crown (85) with lateral slots (87, 87') designed for the reception of each pair of segments (35, 35') of the outer envelope tube (33) between pairs of sealing bands (89, 89'); and inner radial teeth (86) designed for the support and sliding of the inner absorber tube (31) and radial tightening means for said flanges (83, 83').

2. The device, as claimed in claim 1, wherein the inner absorber tube (31) is shaped as a continuous tube.

3. The device, as claimed in claim 1, wherein the collection tube (21) supports (23) are shaped as a rigid structure and fixed to a bearing structure of the collection unit (11).

4. The device, as claimed in claim 1, wherein said joints (51) comprise: flanges (53, 53') with co-operating means (55, 59; 55', 59') with ends (57, 57') of each pair of segments of the outer envelope tube (33); a ring (61) placed between said flanges (53, 53'), fixed to a support (23); sealing bands (63, 63') placed in openings of said ring (61) adjacent to said ends (57, 57'); an insulation crown (62) with inner radial teeth (64) designed for the support and sliding of the inner absorber tube (31) joined to said ring (61); and axial tightening means designed to bring said ends (57, 57') close to the ring (61).

5. The device, as claimed in claim 4, characterized in that the insulation crown (62) is connected to the ring (61) by means of floating point contacts capable of avoiding thermal tensions between said insulation crown (62) and said ring (61).

6. The device, as claimed in claim 1, wherein said outer envelope tube (33) is made of glass.

7. The device, as claimed in claim 6, wherein the outer envelope tube (33) is made of glass and wherein the thickness of said outer envelope tube is between 2.5 and 3.5 mm.

8. The device, as claimed in claim 1, wherein the inner absorber tube (31) has a circular cross-section and a diameter of between 70 and 90 mm.

9. The device, as claimed in claim 1, wherein said inner absorber tube (31) has an oval cross-section.

10. The device, as claimed in claim 1, wherein the useful collection surface of the collection tube (21) is between 97%-98% of its total length.

11. The device, as claimed in claim 1, wherein the focal length is between 1,700 mm and 1,900 mm.

12. The device, as claimed in claim 1, wherein the length of the segments of the outer envelope tube (33) united by the joints (51, 81, 95, 95') is between 4 and 6 m.

13. The device, as claimed in claim 1, wherein the inner absorber tube (31) is formed by multiple segments joined by welds, wherein the length of the segments is between 12 and 16 m.

14. The device, as claimed in claim 12, wherein the connection between the segments of the outer envelope tube (33) is made by means of retractable bushings (127).

15. The device, as claimed in claim 1, wherein the solar radiation is collected by means of parabolic reflectors.

16. The device, as claimed in claim 1, wherein said means comprise vacuum pumps.

17. The device, as claimed in claim 16, wherein each collection unit (11) is formed by two semi-collectors (13, 13') and are connected by vacuum pumps (41, 43) at a central part (41) and at an end (43).

18. The device, as claimed in claim 17, wherein the device further comprises an element (45) that is connected to the central part of each collection unit (11), designed for the introduction of a gas that allows to drag the hydrogen present in the collection tube (21) space between the inner absorber tube and the outer envelope tube (33), in collaboration with the vacuum pumps (43) connected to the ends of each collection unit (11).

19. The device, as claimed in claim 1, wherein the pressure is achieved without implementing a Getter system.

20. The device, as claimed in claim 1, wherein the outer envelope tube (33) is formed by multiple segments united by joints (51, 81, 95, 95'), wherein when the intermediate space (21) is subjected to pressure, the segments of the outer envelope tube (33) dilate or contract due to an increase or decrease of temperature without comprising the pressure in the intermediate space (21).

21. The device, as claimed in claim 20, wherein the segments of the outer envelope tube comprise ends and wherein the dilation or contraction of the outer envelope tube is absorbed by sealing bands adjacent to said ends.

22. The device, as claimed in claim 1, wherein said outer envelope tube (33) is made of polymethylmethacrylate (PMMA).

23. The device, as claimed in claim 1, characterized in that it further comprises support and slide means for the inner absorber tube (31) comprising a plurality of insulation crowns (62, 85, 112) with inner radial teeth (64, 86, 114) and the plurality of segments (35, 35', 36, 37) and joints (51, 81, 95, 95') are connected by means of hermetic sealing bands (63, 63', 89, 89', 113, 113') capable of absorbing the axial and radial thermal dilations of said segments (35, 35', 36, 37).

24. The device, as claimed in claim 23, characterized in that the thermal insulation provided by the insulation crown (62, 85, 112) and the sealing bands (63, 63', 89, 89', 113, 113') causes the temperature in the areas of said sealing bands (63, 63', 89, 89', 113, 113') to remain below 100° C.

25. The device, as claimed in claim 23, wherein the insulation crown (62, 85, 112) is made of ceramic material.

26. The device, as claimed in claim 1, characterized in that the maximum working temperature of the inner absorber tube (31) lies between 400° C. and 600° C.

27. The device, as claimed in claim 1, characterized in that it further comprises closing elements (25), wherein said closing elements (25) accumulate the total dilations/contractions of the inner absorber tube (31) with respect to the supports (23), without compromising the integrity of the outer envelope tube (33) nor the airtightness in the intermediate space between said outer envelope tube (33) and the inner absorber tube (31).

28. Radiation heat collection device that comprises at least one collection unit (11) equipped with a collection tube (21) placed on supports (23) and reflectors (15), wherein the collection tube is formed by an inner absorber tube (31) and an outer envelope tube (33), the reflectors (15) direct the radiation toward the collection tube (21), and wherein said radiation heat collection device comprises means designed to maintain the collection tube (21) space between the inner absorber tube (31) and the outer envelope tube (33) at a pressure of between $5\times10^{-1}$ to $5\times10^{-2}$ mbar when the device is operative, wherein each collection unit is formed by multiple groups of segments (36, 37) of the outer envelope tube (33), wherein the segments (36, 37) of each group are united by joints (95) fixed to supports (23), and the ends of each group are united by pairs of joints (95') supported in a displaceable manner on supports (23) with an intermediate bellows device (97), said joints (95, 95') comprising: flanges (101, 101') with co-operating means (105, 109; 105', 109') with the ends (107, 107') of each pair of segments (36, 37) of the outer envelope tube (33); a ring (111) placed between said flanges (101, 101'); sealing bands (113, 113') placed in openings of said ring (112) adjacent to said ends (107, 107'); an insulation crown (112) with inner radial teeth (114) designed for the support and sliding of the inner absorber tube (31) joined to said ring (111); and means designed to maintain said ends (107, 107') and the ring (111) immobilized.

29. The device, as claimed in claim 28, wherein the means designed to maintain said ends (107, 107') and the ring (111) immobilized include encapsulated traction springs (104, 104').

\* \* \* \* \*